(12) United States Patent
Kawamoto et al.

(10) Patent No.: US 12,051,027 B2
(45) Date of Patent: Jul. 30, 2024

(54) INFORMATION PROCESSING METHOD AND INFORMATION PROCESSING SYSTEM

(71) Applicant: Panasonic Intellectual Property Management Co., Ltd., Osaka (JP)

(72) Inventors: Hirokazu Kawamoto, Osaka (JP); Hiroaki Urabe, Osaka (JP); Satoru Hayama, Hyogo (JP); Naoyuki Harada, Tokyo (JP); Atsuyoshi Kita, Osaka (JP)

(73) Assignee: PANASONIC INTELLECTUAL PROPERTY MANAGEMENT CO, LTD., Osaka (JP)

( * ) Notice: Subject to any disclaimer, the term of this patent is extended or adjusted under 35 U.S.C. 154(b) by 419 days.

(21) Appl. No.: 17/371,860

(22) Filed: Jul. 9, 2021

(65) Prior Publication Data

US 2021/0334928 A1    Oct. 28, 2021

Related U.S. Application Data

(63) Continuation of application No. PCT/JP2020/019437, filed on May 15, 2020.

(30) Foreign Application Priority Data

May 20, 2019    (JP) .................................. 2019-094318

(51) Int. Cl.
*G06Q 50/28* (2012.01)
*B60W 60/00* (2020.01)
(Continued)

(52) U.S. Cl.
CPC ....... *G06Q 10/08* (2013.01); *B60W 60/00256* (2020.02); *B65G 43/00* (2013.01);
(Continued)

(58) Field of Classification Search
CPC ............ G06Q 50/28; G06Q 10/06312; G06Q 10/06313; G06Q 10/06315;
(Continued)

(56) References Cited

U.S. PATENT DOCUMENTS 8,190,315 B2 * 5/2012  Kraeling ............. B61L 15/0027
                                                         701/19
9,900,747 B1 * 2/2018  Park ...................... H04W 4/029
(Continued)

FOREIGN PATENT DOCUMENTS

CA    2685910 A1 * 11/2008 ........... G01C 21/343
JP    2003-2444          1/2003
(Continued)

OTHER PUBLICATIONS

Zhengzheng et al., "Customer Point Collaboration-Based Multi-trip Vehicle Scheduling Algorithm to Pickup and Delivery Service to Airport," 2014, Publisher: IEEE.*
(Continued)

*Primary Examiner* — Tuan C To
(74) *Attorney, Agent, or Firm* — Wenderoth, Lind & Ponack, L.L.P.

(57) ABSTRACT

An information processing method causes a computer to execute acquiring a first delivery schedule generated based on a plurality of first destinations and a moving unit for providing delivery or service based on the first destinations, acquiring an attribute of the moving unit, acquiring a plurality of second destinations obtained from a revision in the first destinations after generating of the first delivery schedule, determining a fixed part regarding a destination that is not allowed to be changed on the first delivery schedule of the moving unit, in accordance with the attribute of the moving unit, and generating a second delivery schedule in
(Continued)

accordance with the moving unit and the second destinations, without changing the fixed part.

7 Claims, 7 Drawing Sheets

(51) Int. Cl.
| | | |
|---|---|---|
| B65G 43/00 | (2006.01) | |
| G01C 21/34 | (2006.01) | |
| G06Q 10/06 | (2023.01) | |
| G06Q 10/0631 | (2023.01) | |
| G06Q 10/08 | (2023.01) | |
| G07C 5/00 | (2006.01) | |
| B60P 3/00 | (2006.01) | |

(52) U.S. Cl.
CPC ... *G01C 21/3407* (2013.01); *G06Q 10/06312* (2013.01); *G06Q 10/06313* (2013.01); *G06Q 10/06315* (2013.01); *G07C 5/008* (2013.01); *B60P 3/007* (2013.01)

(58) Field of Classification Search
CPC ............. B60W 60/00256; B65G 43/00; G01C 21/3407; G07C 5/008; B60P 3/007
USPC .......................................................... 701/26
See application file for complete search history.

(56) References Cited

U.S. PATENT DOCUMENTS

| | | | | |
|---|---|---|---|---|
| 10,852,737 | B2* | 12/2020 | Szubbocsev | ............. B60L 58/16 |
| 11,755,963 | B1* | 9/2023 | Avital | .................... G06F 3/0484 |
| | | | | 705/6 |
| 2004/0030604 | A1* | 2/2004 | Young | .................... G06Q 30/02 |
| | | | | 705/307 |
| 2008/0027772 | A1* | 1/2008 | Gernega | ................. G06Q 10/04 |
| | | | | 705/7.26 |
| 2008/0275643 | A1* | 11/2008 | Yaqub | ................... G01C 21/343 |
| | | | | 340/995.19 |
| 2013/0024060 | A1 | 1/2013 | Sukkarie et al. | |
| 2017/0154394 | A1* | 6/2017 | Kan | .................... G06Q 10/0635 |
| 2017/0169373 | A1* | 6/2017 | Roulland | ......... G06Q 10/06313 |
| 2018/0338223 | A1* | 11/2018 | Park | ....................... H04W 4/029 |
| 2018/0349850 | A1* | 12/2018 | Hosoda | ............ G06Q 10/08355 |
| 2018/0374019 | A1* | 12/2018 | Basanets | ................ G06Q 10/06 |
| 2019/0294173 | A1* | 9/2019 | Szubbocsev | ...... B60W 60/0023 |
| 2020/0173800 | A1* | 6/2020 | Dudar | .................... G06Q 50/30 |
| 2020/0211140 | A1* | 7/2020 | Horton | ............. G06Q 10/06315 |
| 2021/0278224 | A1* | 9/2021 | Davis | ................ G01C 21/3407 |

FOREIGN PATENT DOCUMENTS

| | | | | |
|---|---|---|---|---|
| JP | 2012-53861 | | 3/2012 | |
| WO | WO-2017160276 | A1 * | 9/2017 | ......... G01C 21/3423 |
| WO | WO-2017205961 | A1 * | 12/2017 | |
| WO | WO-2018135834 | A1 * | 7/2018 | |

OTHER PUBLICATIONS

Xiaxia et al., "The Vehicle Routing and Scheduling Best Balance Model and Algorithm for Free Pickup and Delivery Service in Flight Ticket Sales Companies," 2010, Publisher: IEEE.*

Extended European Search Report issued Jun. 28, 2022 in corresponding European Patent Application No. 20810224.4.

International Search Report issued Aug. 11, 2020 in International (PCT) Application No. PCT/JP2020/019437.

Oki et al., "Modeling of a Vehicle Routing Problem with Actual Constraints and Re-scheduling for Dynamic Requests", Transactions of the Society of Instrument and Control Engineers, vol. 55, No. 4, Apr. 2019, pp. 313-323, with English translation, 43 pages.

* cited by examiner

FIG. 4
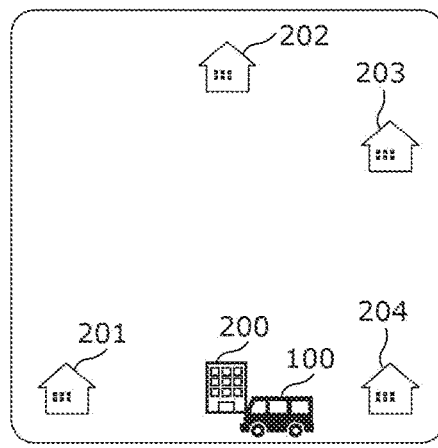
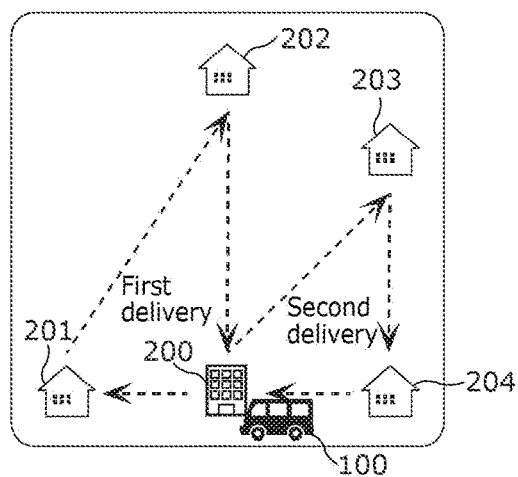
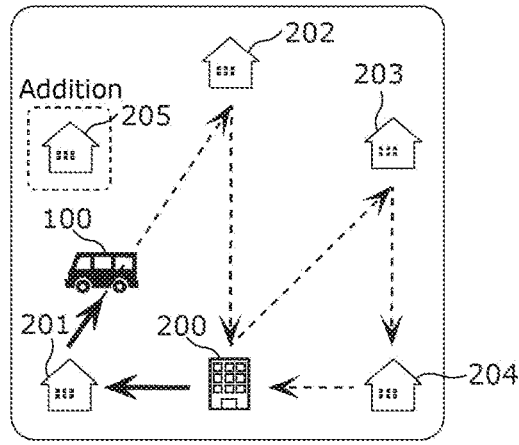

FIG. 6

| Attribute of moving unit | State of moving unit | Fixed part |
|---|---|---|
| Automatic operating vehicle (capable of transmitting and receiving delivery schedules) | Other than little fuel left | None |
| Automatic operating vehicle (capable of transmitting and receiving delivery schedules) | Little fuel left | Current round |
| Non-automatic operating vehicle (capable of transmitting and receiving delivery schedules) | At stop | None |
| Non-automatic operating vehicle (capable of transmitting and receiving delivery schedules) | Positioned at long distance from next destination | None |
| Non-automatic operating vehicle (capable of transmitting and receiving delivery schedules) | Running | Next destination |
| Non-automatic operating vehicle (capable of transmitting and receiving delivery schedules) | Positioned at short distance from next destination | Next destination |
| Cold-storage (refrigerated) vehicle | Arbitrary | Next destination |
| Vehicle incapable of transmitting and receiving delivery schedules at places other than base place | Arbitrary | Current round |
| Vehicle with preset loading order | Arbitrary | Current round |
| Vehicle with driver of poor experience | Arbitrary | Current round |

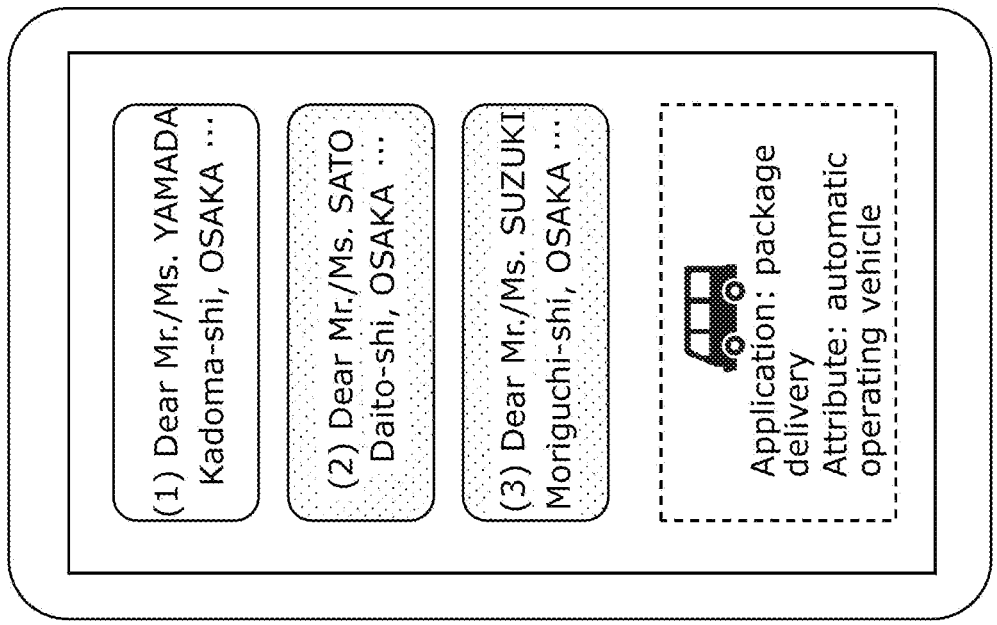
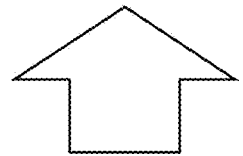
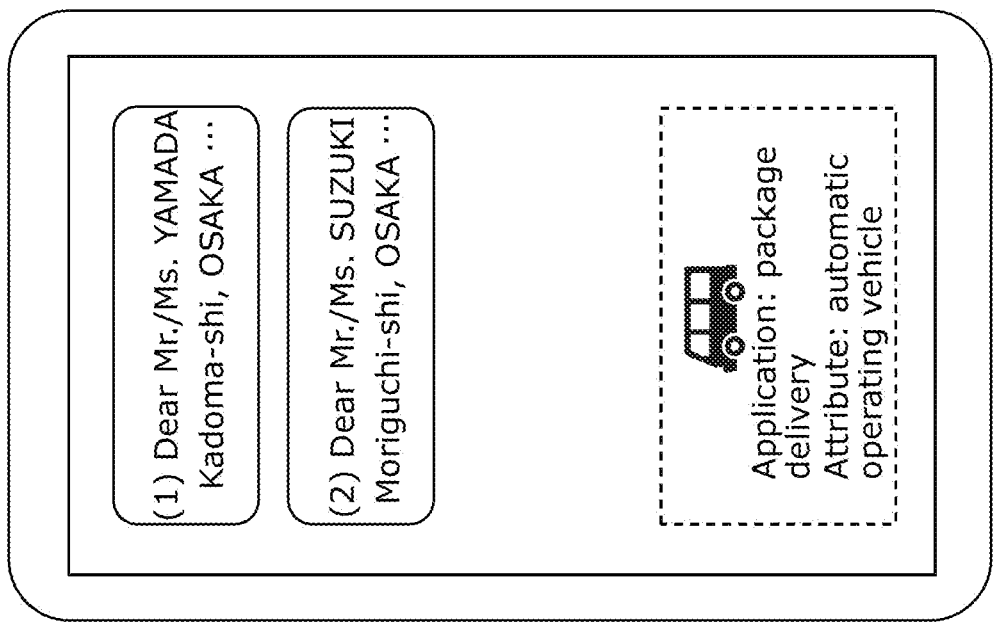
FIG. 7

INFORMATION PROCESSING METHOD AND INFORMATION PROCESSING SYSTEM

CROSS REFERENCE TO RELATED APPLICATIONS

This is a continuation application of PCT International Application No. PCT/JP2020/019437 filed on May 15, 2020, designating the United States of America, which is based on and claims priority of Japanese Patent Application No. 2019-094318 filed on May 20, 2019. The entire disclosures of the above-identified applications, including the specifications, drawings and claims are incorporated herein by reference in their entirety.

FIELD

The present disclosure relates to an information processing method and an information processing system that generate a trip schedule for a moving unit.

BACKGROUND

An unscheduled delivery task may arise after the arrangement of a delivery schedule and the start of delivery tasks with vehicles. For such a case, a delivery schedule supporting device has been disclosed, in which the presence or absence of any target candidate vehicle capable of responding to an additional unscheduled delivery task is determined from among moving vehicles, and if there is any such a target candidate vehicle, each target candidate vehicle is prioritized to determine the one with the highest priority as a target vehicle, and if there is no such a target candidate vehicle, a vehicle in a standby mode is newly regarded as a target vehicle (e.g., Patent Citation [PTL] 1). This allows revisions in a delivery schedule even if an unscheduled delivery task arises after the start of delivery tasks.

CITATION LIST

Patent Literature

PTL 1: Japanese Unexamined Patent Application Publication No. 2003-2444

SUMMARY

Technical Problem

However, a delivery schedule revised by the delivery schedule supporting device disclosed in PTL 1 may not adapt to the operational system of a company.

The present disclosure provides an information processing method and an information processing system that allow regeneration of a trip schedule adaptable to the operational system of a company.

Solution to Problem

An information processing method according to one aspect of the present disclosure is a method that is executed by a computer and includes acquiring a first trip schedule generated based on a plurality of first destinations and a moving unit for providing delivery or service based on the plurality of first destinations, acquiring an attribute of the moving unit, acquiring a plurality of second destinations obtained from a revision in the plurality of first destinations after generation of the first trip schedule, determining a fixed part regarding a destination that is not allowed to be changed on the first trip schedule of the moving unit, in accordance with the attribute of the moving unit, and generating a second trip schedule in accordance with the plurality of second destinations and the moving unit, without changing the fixed part.

Advantageous Effects

According to the present disclosure, it is possible to regenerate a trip schedule adaptable to the operational system of a company.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is an illustration of a delivery procedure according to a first delivery schedule before an unscheduled delivery task arises.

FIG. 6 is an illustration of a table showing one example of fixed parts determined based on the attributes and states of moving units.

FIG. 7 shows an example of presentation when a delivery schedule is revised from the first delivery schedule to the second delivery schedule.

DESCRIPTION OF EMBODIMENTS

Figure 1:
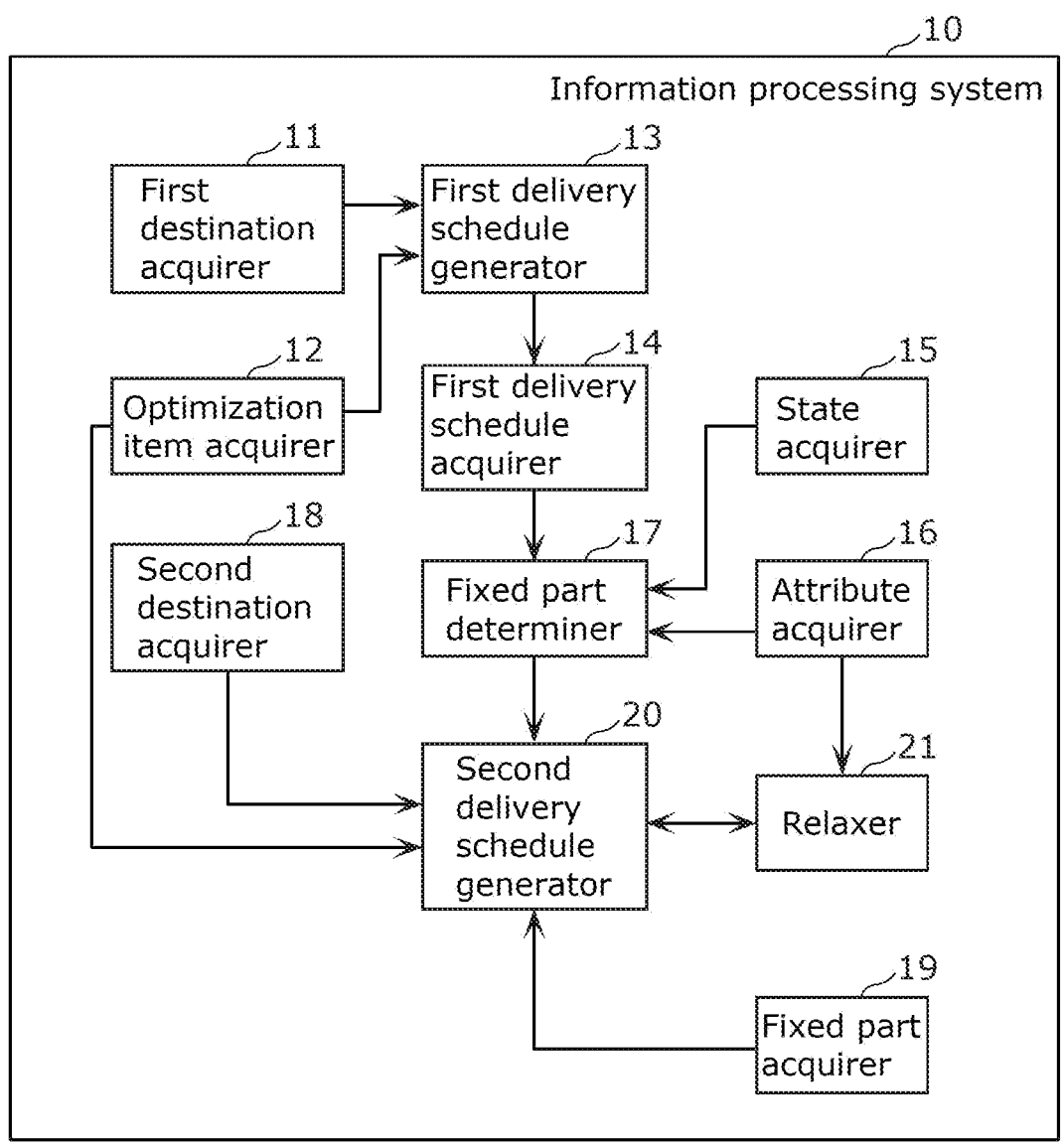
FIG. 1 shows one configuration example of an information processing system according to an embodiment.

[Logic Behind Achievement of One Embodiment of Present Disclosure]

Delivery service such as home delivery handles delivery of an enormous number of objects to be delivered such as packages, and there are many cases in which delivery tasks are not conducted according to an initial delivery schedule that is generated before the start of the delivery tasks. These cases include a case in which a package that needs to be promptly delivered has arrived at a base place of delivery, a case in which a package has been mistakenly loaded on a moving unit that has started delivery tasks, and a case in which a request to change the delivery date and time of an object to be delivered has been received. In such cases, revisions in the initial delivery schedule may be required. However, the initial delivery schedule often includes a fixed part that is not allowed to be changed. Such a fixed part is expected to vary depending on the operational system of a delivery company. Thus, if the delivery schedule is regenerated without giving consideration to the fixed part, the regenerated delivery schedule may not adapt to a company because the operational system varies depending on company. In view of this, the following description is given of an information processing method and an information processing system that allow regeneration of a trip schedule (e.g., delivery schedule) adaptable to the operational system of a company.

An information processing method according to one aspect of the present disclosure is a method that is executed by a computer and includes acquiring a first trip schedule generated based on a plurality of first destinations and a moving unit for providing delivery or service based on the plurality of first destinations, acquiring an attribute of the moving unit, acquiring a plurality of second destinations obtained from a revision in the plurality of first destinations after generation of the first trip schedule, determining a fixed part regarding a destination that is not allowed to be changed on the first trip schedule of the moving unit, in accordance with the attribute of the moving unit, and generating a second trip schedule in accordance with the plurality of second destinations and the moving unit, without changing the fixed part.

Depending on the operational system of a company, the first trip schedule may include a fixed part regarding a destination that is not allowed to be changed. For example, depending on the operational system of a company, the attribute of a moving unit to be used for trip by the company may be changed, and the fixed part may vary depending on the attribute of the moving unit. If the second trip schedule is generated by changing the fixed part, the company may become incapable of using the second trip schedule. In contrast, the fixed part is determined based on the attribute of a moving unit, and the second trip schedule that replaces the first trip schedule is generated without changing the fixed part (in other words, by changing parts other than the fixed part). That is, according to this aspect, it is possible to regenerate a trip schedule adaptable to the operational system of a company. By generating a trip schedule adaptable to the operational system of a company, it is possible to improve the efficiency of trip while corresponding to changes in moving tasks.

Alternatively, the fixed part may be at least one of the plurality of first destinations. The fixed part may also be a group of destinations that are included in one round of a trip among the plurality of first destinations.

As described above, the fixed part may be at least one of the first destinations on the first trip schedule, or may be a group of destinations that are included in one round of a trip among the first destinations on the first trip schedule, i.e., a group of destinations that are visited by a moving unit from the time of departure from a base place to the time of return to the base place.

Alternatively, the attribute of the moving unit may include an attribute regarding whether or not automatic operation is possible, an attribute regarding whether or not communication connection is possible, and an attribute regarding a type of delivery equipment or service equipment that is to be mounted on the moving unit.

For example, when the attribute of the moving unit is an attribute capable of automatic operation, the fixed part does not necessarily have to be provided. This is because, even if an unscheduled moving task arises during a trip after the start of moving tasks, a moving unit capable automatic operation is basically capable of receiving an instruction to revise the schedule at any time and remains flexible in response to the unscheduled moving task. For example, when the attribute of the moving unit is an attribute incapable of automatic operation, the current destination of the moving unit may be determined as the fixed part. This is because, even if an unscheduled moving task arises during a trip after the start of moving tasks, the driver of the moving unit incapable of automatic operation is unable to check an instruction to revise the trip schedule during driving and is thus unable to respond to the unscheduled moving task. For example, when the attribute of the moving unit is an attribute incapable of communication connection, a group of destinations included in a current round of a trip may be determined as the fixed part. This is because, even if an unscheduled moving task arises during a trip after the start of moving tasks, the moving unit incapable of communication connection is also incapable of receiving an instruction to revise the trip schedule and continues the current round of a trip. For example, when the attribute of the moving unit is a moving unit with cold-storage or refrigerated equipment, the current destination of the moving unit may be determined as the fixed part. This is because, if the moving unit responds to an unscheduled moving task, objects (packages) in a cold-storage or refrigerated state that are being delivered or in service may become degraded in quality.

Alternatively, the information processing method may further include acquiring a state of the moving unit, and determining the fixed part in accordance with the attribute of the moving unit and the state of the moving unit.

For example, the fixed part may vary depending on the state of the moving unit. Thus, if the fixed part is determined based also on the state of the moving unit, it is possible to regenerate a delivery schedule that is more adaptable to a company.

Alternatively, the state of the moving unit may include a state of a remaining amount of moving energy, a running state, or a distance from a destination.

For example, when the amount of moving energy left in the moving unit is small, a group of destinations included in a current round of a trip may be determined as the fixed part. This is because, if the moving unit responds to an unscheduled moving task, the moving unit consumes extra energy for the unscheduled moving task and may become short of energy. For example, when the attribute of the moving unit is an attribute incapable of automatic operation and the moving unit is at a stop, the fixed part does not necessarily have to be provided. This is because, even if an unscheduled moving task arises during a trip after the start of moving tasks, the driver of the moving unit incapable of automatic operation is able to check an instruction to revise the trip schedule during the stop and is thus able to respond to the unscheduled moving task. For example, when the current location of the moving unit is away from the next destination, the fixed part does not necessarily have to be provided. This is because, when the moving unit is positioned at a long distance from the next destination, the moving unit may become capable of responding to an unscheduled moving task on the way to the next destination, or when all things are considered, it is more efficient for the moving unit during a trip to respond to an unscheduled moving task on the way to the next destination. For example, when the current location of the moving unit is close to the next destination, the current destination of the moving unit may be determined as the fixed part. This is because, when the moving unit is positioned at a short distance from the next destination, in most cases the moving unit is incapable of suddenly responding to an unscheduled moving task on the way to the next destination, or when all things are considered, it is more efficient for the moving unit during a trip to first complete the trip to the next closer destination and then respond to the unscheduled moving task.

Alternatively, when generation of the second trip schedule has failed, a constraint on the generation of the second trip schedule is relaxed based on the attribute of the moving unit. Specifically, the information processing method may further include determining the constraint to be relaxed from among dispensable constraints included in all constraints on the generation of the second trip schedule, in accordance with the attribute of the moving unit.

For example, the second trip schedule is generated to satisfy specific constraints. However, depending on the attribute of the moving unit, some of the constraints may be relaxed. In view of this, when the generation of the second trip schedule has failed, dispensable constraints may be relaxed based on the attribute of the moving unit so as to increase the possibility of success in the generation of the second trip schedule.

An information processing system according to one aspect of the present disclosure includes a first trip schedule acquirer that acquires a first trip schedule generated based on a plurality of first destinations and a moving unit for providing delivery or service based on the plurality of first destinations, an attribute acquirer that acquires an attribute of the moving unit, a second destination acquirer that acquires a plurality of second destinations obtained from a revision in the plurality of first destinations after generation of the first trip schedule, a fixed-part determiner that determines a fixed part regarding a destination that is not allowed to be changed on the first trip schedule of the moving unit, in accordance with the attribute of the moving unit, and a second trip schedule generator that generates a second trip schedule in accordance with the plurality of second destinations and the moving unit, without changing the fixed part.

Accordingly, it is possible to provide an information processing system that allows regeneration of a trip schedule adaptable to the operational system of a company.

It is to be noted that each embodiment described below is a specific example of the present disclosure. Numerical values, shapes, constituent elements, steps, a sequence of steps, and so on described in the following embodiments are merely examples and do not intend to limit the scope of the present disclosure.

In the following description, the term delivery is used as a concept that also includes the collection of packages. That is, the term delivery means not only delivering objects to be delivered to destinations, but also collecting objects to be delivered at destinations. Objects to be delivered are not limited to goods, and may be persons.

Embodiment

Hereinafter, a configuration of an information processing system and an information processing method performed by the information processing system will be described in detail.

FIG. 1 shows one configuration example of information processing system 10 according to an embodiment.

Information processing system 10 is a system that manages a moving unit (in the present embodiment, a plurality of moving units) and generates a trip schedule (e.g., delivery schedule) for causing the moving unit to deliver objects to be delivered as efficiently as possible. For example, information processing system 10 may be a computer such as a server. Note that information processing system 10 may be a computer that is installed at a base place of delivery of objects to be delivered by moving units. Alternatively, information processing system 10 may be a portable terminal.

The moving units provide delivery or service based on a plurality of destinations that are set in advance. For example, the moving units may be vehicles. This is, however, merely one example, and the moving units may be other moving units such as drones, aircrafts, or marine vessels.

Information processing system 10 includes first destination acquirer 11, optimization-item acquirer 12, first delivery schedule generator 13, first delivery schedule acquirer 14, state acquirer 15, attribute acquirer 16, fixed-part determiner 17, second destination acquirer 18, fixed-part acquirer 19, second delivery schedule generator 20, and relaxer 21. Information processing system 10 is a computer that includes, for example, a processor, a memory, and a communication circuit. The memory may, for example, be a read only memory (ROM) or a random access memory (RAM) and is capable of storing programs to be executed by the processor. First destination acquirer 11, optimization-item acquirer 12, first delivery schedule generator 13, first delivery schedule acquirer 14, state acquirer 15, attribute acquirer 16, fixed-part determiner 17, second destination acquirer 18, fixed-part acquirer 19, second delivery schedule generator 20, and relaxer 21 are realized by the processor executing the programs stored in the memory. Note that these constituent elements of information processing system 10 may be dispersed and arranged in a plurality of computers (e.g., servers).

First destination acquirer 11 acquires a plurality of first destinations. For example, the first destinations may be delivery destinations that are known in advance before the start of delivery tasks. First destination acquirer 11 acquires the first destinations by, for example, allowing a user of a company using information processing system 10 (user of information processing system 10) to input or transmit a plurality of first destinations to information processing system 10.

Optimization-item acquirer 12 acquires optimization items. The optimization items are items that are desired to be optimized on a delivery schedule by a company using information processing system 10. Examples of the optimization items include items regarding trip distance, items regarding trip time, and items regarding the number of moving units. The optimization items vary depending on company, and items to be selected are suitable for purposes to which each company attaches importance. For example, a user of a company that attaches importance to a reduction in the number of operating moving units as small as possible in order to cut costs selects items regarding the number of moving units as an optimization item. Note that the optimization items may be a combination of a plurality of items selected from among the items described above. For example, optimization items may be acquired so as to optimize both trip distance and the number of moving units. Optimization-item acquirer 12 acquires the optimization items by, for example, allowing a user to input or transmit optimization items to information processing system 10. Note that information processing system 10 does not necessarily have to include optimization-item acquirer 12.

First delivery schedule generator 13 generates a first delivery schedule on the basis of a plurality of first destinations and moving units used to deliver objects to be delivered in accordance with the first destinations. For example, first delivery schedule generator 13 generates the first delivery schedule on the basis of information such as destinations, available moving units, arrival times at destinations, operating times at destinations, requirements for moving units used to deliver objects to be delivered. When information processing system 10 includes optimization-item acquirer 12, first delivery schedule generator 13 generates the first delivery schedule on the basis of also optimization items. For example, first delivery schedule generator 13 generates a schedule for performing tasks as efficiently as possible while satisfying optimization items with use of a moving unit that is managed by information processing system 10, the tasks including delivering objects to be delivered to the first destinations and collecting objects to be delivered at the first destinations. There are no particular limitations on the method of generating a delivery schedule.

First delivery schedule acquirer 14 acquires the generated first delivery schedule. Note that information processing system 10 does not necessarily have to include first destination acquirer 11 and first delivery schedule generator 13, and first delivery schedule acquirer 14 may acquire a first delivery schedule that is generated outside information processing system 10.

State acquirer 15 acquires states of moving units. Examples of the states of moving units include states of the remaining amounts of moving energy, running states, and distances from destinations. Information processing system 10 is communicably connected to the moving units and acquires the states of the moving units that are estimated based on information such as the remaining amounts of moving energy transmitted from the moving units, operating states of engines or the like, or positional information about the moving units. Note that information processing system 10 does not necessarily have to include state acquirer 15.

Attribute acquirer 16 acquires attributes of moving units. Examples of the attributes of moving units include attributes regarding whether or not automatic operation is possible, attributes regarding whether or not communication connection is possible, and attributes regarding the types of delivery equipment or service equipment that is mounted on the moving units (in the present example, delivery equipment). For example, the attributes of moving units used for delivery by a company may vary depending on the operational system of the company, and attribute acquirer 16 acquires the attributes of moving units by, for example, allowing a user to input or transmit the attributes of moving units to information processing system 10.

Fixed-part determiner 17 determines a fixed part regarding destinations that are not allowed to be changed on the first delivery schedule of a moving unit, on the basis of the attribute of the moving unit. When information processing system 10 includes state acquirer 15, fixed-part determiner 17 determines the fixed part on the basis of also the attribute and state of the moving unit. The fixed part may be at least one of the first destinations, or may be a group of destinations included in one round of a trip among the first destinations. The details of the fixed part will be described later.

Second destination acquirer 18 acquires a plurality of second destinations obtained from a revision in the first destinations after the generation of the first delivery schedule. The second destinations include, for example, destinations that are not scheduled for delivery on the first delivery schedule, i.e., additional unscheduled destinations on the first delivery schedule. For example, a task of delivering an objected to be delivered to an unscheduled destination may arise as a result of the occurrence of events such as where a package that needs to be promptly delivered has arrived at a base place of delivery, where a package has been mistakenly loaded on a moving unit that has started a delivery task, or where a request to change the delivery date and time of an object to be delivered has been received. Second destination acquirer 18 acquires the second destinations by, for example, allowing a user to input or transmit the second destinations including an unscheduled destination as described above to information processing system 10.

Fixed-part acquirer 19 acquires a fixed part that is set by a user. In the case where there is a condition that cannot be grasped by information processing system 10, for example, a user is able to manually set a fixed part separately from the fixed part determined by fixed-part determiner 17. For example, in the case where a driver (moving unit) needs to complete delivery tasks more quickly than usual, a user may set a fixed part that makes it possible to quickly complete the delivery tasks.

Second delivery schedule generator 20 generates a second delivery schedule without changing the fixed part on the basis of a plurality of second destinations and moving units. When information processing system 10 includes optimization-item acquirer 12, second delivery schedule generator 20 generates the second delivery schedule on the basis of also optimization items. Second delivery schedule generator 20 generates a schedule for performing tasks as efficiently as possible without changing the fixed part while satisfying the optimization items with use of a moving unit managed by information processing system 10, the tasks including delivering objects to be delivered to the second destinations and collecting objects to be delivered at the second destinations. The details of the second delivery schedule will be described later.

When the generation of the second delivery schedule has failed, relaxer 21 relaxes constraints on the generation of the second delivery schedule on the basis of the attribute of a moving unit. For example, relaxer 21 determines constraints that are to be relaxed from among dispensable ones of constraints, on the basis of the attribute of a moving unit. Examples of the constraints include constraints on the time zone of delivery, constraints on the number of objects to be delivered that can be loaded on the moving unit, and constraints on trip distance, and some of the constraints may be relaxed depending on the attribute of the moving unit. Note that the constraints include indispensable constraints and dispensable constraints, and whether each constraint is dispensable or indispensable varies depending on company. For example, when a company uses automatic operating moving units (unattended moving units), or in other words, when the attributes of moving units are unattended moving units, constraints on the time zone of delivery are not indispensable and it is possible to relax (i.e., extend) the time zone of delivery because the unattended moving units can handle a large number of tasks. On the other hand, when a company uses non-automatic operating moving units, or in other words, when the attributes of moving units are not unattended moving units, constraints on the time zone of delivery may become indispensable because there is an upper limit for the number of tasks that can be handle by the drivers of the moving units. Note that information processing system 10 does not necessarily have to include relaxer 21.

Although not shown, information processing system 10 includes an output unit that outputs the generated second delivery schedule. When the output unit outputs the second delivery schedule, for example, the second delivery schedule is transmitted to the moving unit, or the second delivery schedule is presented to the user of information processing system 10.

Next, before detailed description of operations of information processing system 10, an overall procedure of processing for revising a delivery schedule, performed among the user of information processing system 10, information processing system 10, and a plurality of moving units, will be described with reference to FIG. 2.

Figure 2:
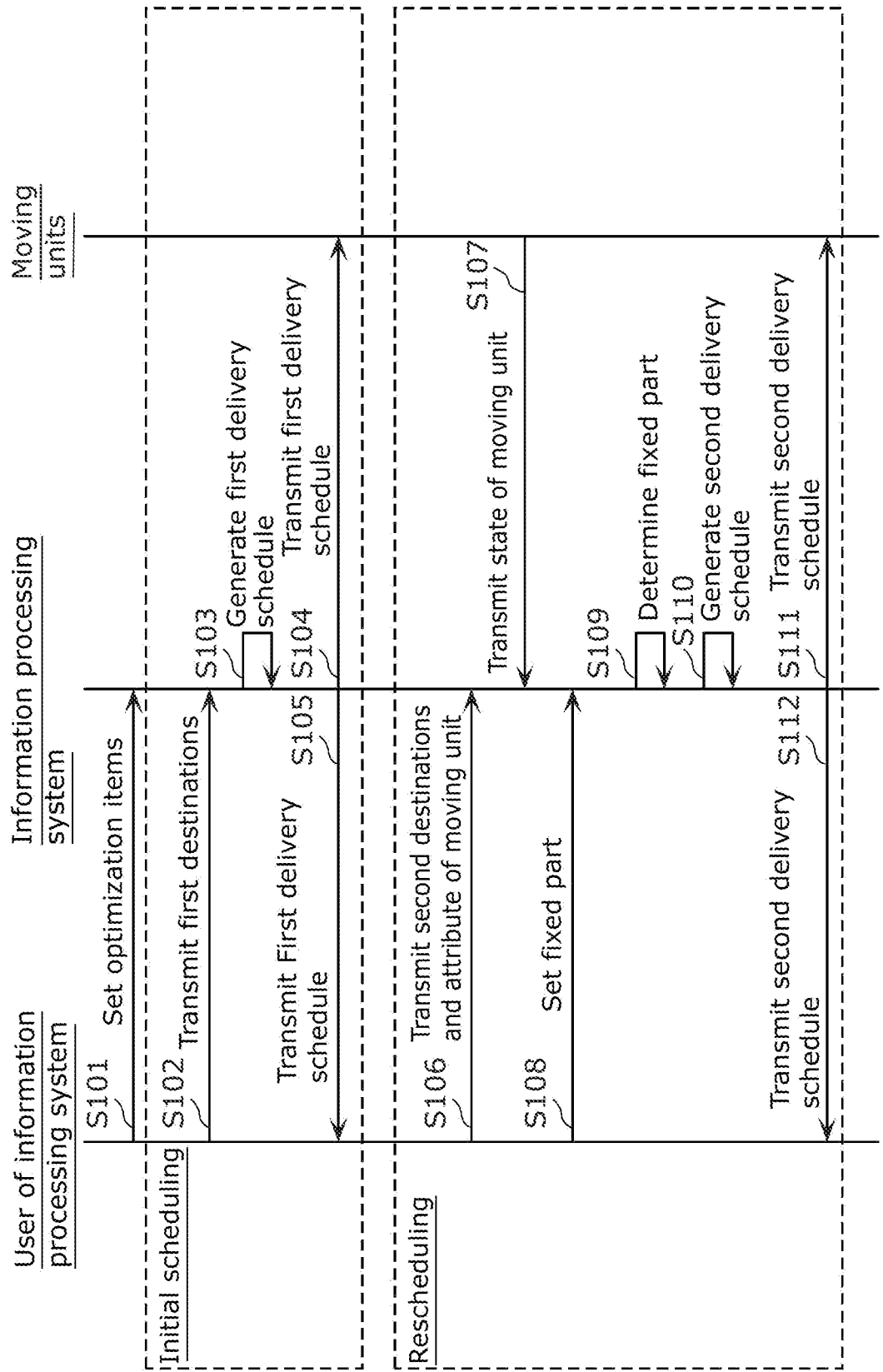
FIG. 2 is a sequence diagram showing one example of a procedure of processing for revising a delivery schedule.

FIG. 2 is a sequence diagram showing one example of the procedure of processing for revising a delivery schedule. FIG. 2 is an illustration of a procedure of processing for generating and transmitting a first delivery schedule (initial scheduling) and a procedure of processing for generating and transmitting a second delivery schedule (rescheduling).

First, a user of information processing system 10 sets optimization items (step S101). Accordingly, information processing system 10 acquires the optimization items.

The user of information processing system 10 then transmits a plurality of first destinations that are known in advance to information processing system 10 (step S102).

Information processing system 10 generates a first delivery schedule on the basis of the first destinations and a plurality of moving units that are used to deliver objects to be delivered in accordance with the first destinations (step S103).

Information processing system 10 transmits the first delivery schedule to the moving units (step S104) and also transmits the first delivery schedule to the user of information processing system 10 (step S105). Accordingly, each of the moving units can perform delivery tasks according to the first delivery schedule, and the user of information processing system 10 is able to recognize the first delivery schedule.

In a delivery company that handles an enormous number of objects to be delivered, events that require revisions in the first delivery schedule may occur. Thus, in order to cause information processing system 10 to generate a second delivery schedule that replaces the first delivery schedule, the user of information processing system 10 transmits a plurality of second destinations that include additional destinations corresponding to such events and the attributes of the moving units to information processing system 10 (step S106). There are no particular limitations on the timing of transmission by the user of information processing system 10. For example, a plurality of second destinations including additional destinations that have arisen up to the time of transmission may be transmitted at a predetermined time after the start of the delivery tasks according to the first delivery schedule. Alternatively, when the number of additional destinations has reached or exceeded a predetermined number, a plurality of second destinations including the predetermined number or more of additional destinations may be transmitted.

Each of the moving units transmits the state of the moving unit (its own state) (step S107). For example, when having received a plurality of second destinations and the attributes of moving units, information processing system 10 instructs the moving units to transmit their state. When the second delivery schedule is generated at a predetermined time, the moving units may spontaneously transmit their state to information processing system 10 before the predetermined time.

The user of information processing system 10 sets a fixed part (step S108). Accordingly, information processing system 10 acquires the fixed part set by the user. The fixed part set by the user is such a fixed part that cannot be determined based on the attributes and states of moving units, and as described above, a fixed part for use in coping with a condition that cannot be grasped by information processing system 10.

Information processing system 10 determines a fixed part regarding destinations that are not allowed to be changed on the first delivery schedule, on the basis of the acquired attributes and states of the moving units (step S109).

Information processing system 10 generates a second delivery schedule without changing the fixed part on the first delivery schedule (step S110).

Then, information processing system 10 transmits the generated second delivery schedule to the moving units (step S111) and also transmits the generated second delivery schedule to the user of information processing system 10 (step S112). Accordingly, each of the moving units is capable of performing delivery tasks according to the second delivery schedule that replaces the first delivery schedule, and the user of information processing system 10 is able to recognize the second delivery schedule.

Next, details of the operations of information processing system 10 will be described with reference to FIGS. 3 to 6.

Figure 3:
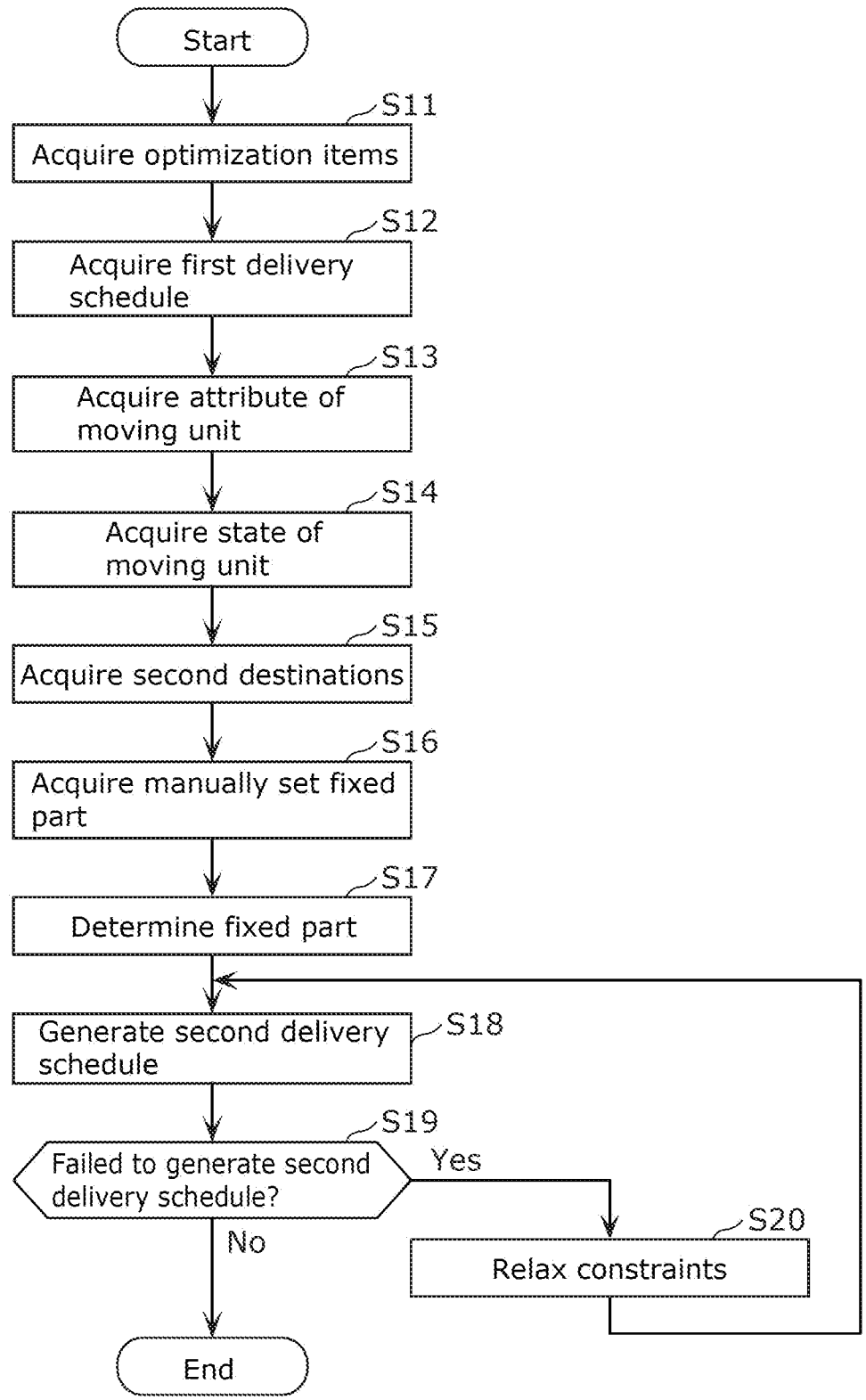
FIG. 3 is a flowchart showing one example of an information processing method performed by the information processing system according to the embodiment.

FIG. 3 is a flowchart showing one example of the information processing method performed by information processing system 10 according to the embodiment. Since information processing system 10 is realized by, for example, a computer, it can be said that the information processing method is a method executed by the computer.

Figure 5A:
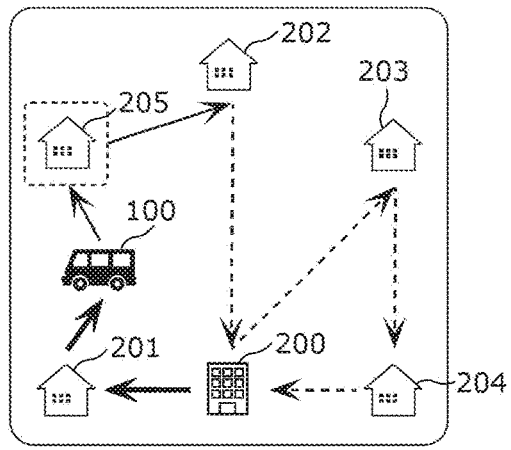
FIG. 5A shows a first example of delivery according to a second delivery schedule.
Figure 5B:
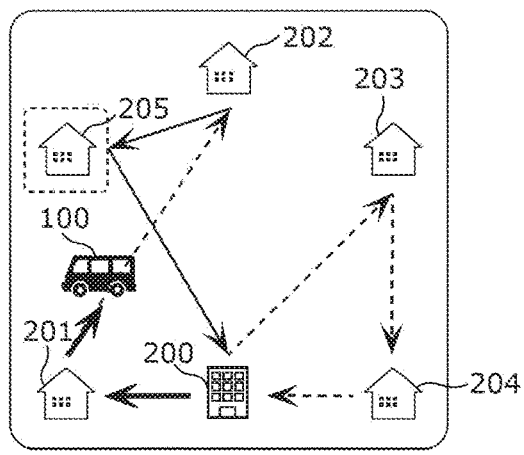
FIG. 5B shows a second example of the delivery according to the second delivery schedule.
Figure 5C:
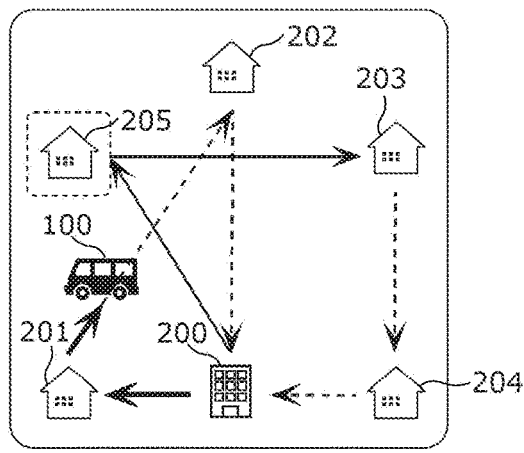
FIG. 5C shows a third example of the delivery according to the second delivery schedule.

FIG. 4 is an illustration of a procedure for delivery up to the occurrence of an unscheduled delivery task on the first delivery schedule. FIGS. 5A to 5C respectively show one to third examples of delivery according to the second delivery schedule. In FIGS. 4 and 5A to 5C, moving unit 100 used for delivery, base place 200 of delivery, and destinations 201 to 205 are illustrated.

FIG. 6 is an illustration of a table showing one example of fixed parts determined based on the attributes and states of moving units.

As illustrated in FIG. 3, information processing system 10 acquires optimization items (step S11). For example, information processing system 10 acquires optimization items such as items regarding trip distance, items regarding trip time, or items regarding the number of moving units. Although an example of the case in which information processing system 10 acquires optimization items is described here, optimization items do not necessarily have to be acquired.

Information processing system 10 acquires a first delivery schedule generated based on a plurality of first destinations and moving unit 100 that delivers objects to be delivered in accordance with the first destinations (step S12). In the present example, since information processing system 10 acquires optimization items, the first delivery schedule is acquired based also on the optimization items. As described above, information processing system 10 does not necessarily have to generate a first delivery schedule, and may acquire a first delivery schedule from outside information processing system 10.

For example, as illustrated in the upper section in FIG. 4, information processing system 10 acquires a first delivery schedule generated based on destinations 201 to 204 serving as a plurality of first destinations and moving unit 100 that delivers objects to be delivered in accordance with destinations 201 to 204. For example, as illustrated in the middle section in FIG. 4, the first delivery schedule is a schedule for departing from base place 200, going sequentially to destinations 201 and 202 before returning to base place 200, departing again from base place 200, and going sequentially to destinations 203 and 204 before returning to base place 200. Although the following description focuses on one moving unit 100, the first delivery schedule and the second delivery schedule both include delivery schedules for a plurality of moving units.

Information processing system 10 acquires the attribute of moving unit 100 (step S13). For example, information processing system 10 acquires, as the attribute of moving unit 100, an attribute regarding whether automatic operation is possible, an attribute regarding whether communication connection is possible, or the type of delivery equipment mounted on moving unit 100. Specifically, information processing system 10 acquires the attribute of moving unit 100 as illustrated in FIG. 6, such as whether the moving unit is an automatic operating vehicle or a non-automatic operating vehicle, whether or not the transmission and reception of delivery schedules are possible, whether or not the moving unit is a cold-storage (refrigerated) vehicle, whether or not the transmission and reception of delivery schedules at places other than base place 200 is impossible, whether or not the order of loading is predetermined, and whether or not the driver is of small experience.

Information processing system 10 acquires the state of moving unit 100 (step S14). For example, information processing system 10 acquires, as the state of moving unit 100, a state of the remaining amount of moving energy, a running state, and distances from destinations. Specifically, information processing system 10 acquires the state of moving unit 100 as illustrated in FIG. 6, such as whether or not the remaining amount of fuel is small, whether or not the moving unit is at a stop, whether or not the moving unit is positioned at a long distance from the next destination, whether or not the moving unit is running, and whether or not the moving unit is positioned at a short distance from the next destination. Although not shown in FIG. 6, information processing system 10 may also acquire the type of a trip road on which the moving unit is running as the state of moving unit 100. For example, information processing system 10 may acquire the state of moving unit such as the state when running in a tunnel and the state when running on an express highway. Although an example of the case in which information processing system 10 acquires the state of moving unit 100 is described in the present example, the state of moving unit 100 does not necessarily have to be acquired.

Information processing system 10 acquires a plurality of second destinations that are revised from the first destinations after the generation of the first delivery schedule (step S15). For example, as illustrated in the lower section in FIG. 4, information processing system 10 acquires destinations 201 to 205 that are revised from destinations 201 to 204. Destination 205 is an additional destination added from among the first destinations.

Information processing system 10 acquires a fixed part set by the user (step S16). For example, when a driver (moving unit) needs to complete delivery tasks more quickly than usual, information processing system 10 acquires such a fixed part that makes it possible to complete the delivery tasks quickly. Alternatively, information processing system 10 does not necessarily have to acquire the fixed part set by the user.

Information processing system 10 determines a fixed part regarding destinations that are not allowed to be changed on the first delivery schedule of moving unit 100 on the basis of the attribute of moving unit 100 (step S17). In the present example, since information processing system 10 acquires the state of moving unit 100, the fixed part is determined based also on the state of moving unit 100. By determining the fixed part based also on the state of moving unit 100, it is possible to regenerate a delivery schedule that is more adaptable to a company. For example, the fixed part may be at least one of the first destinations, or may be a group of destinations that are included in one round of a trip among the first destinations.

Then, information processing system 10 generates a second delivery schedule on the basis of the second destinations and moving unit 100, without changing the fixed part (step S18). When information processing system 10 acquires optimization items, the second delivery schedule is generated based also on the optimization items. For example, a case is considered as illustrated in the lower section in FIG. 4, in which after having departed from base place 200, moving unit 100 has delivered an object to be delivered to destination 201 and then has received a request for an additional destination 205 on the way to next destination 202. Since moving unit 100 has already departed from base place 200, a case is assumed in which the moving unit collects an object to be delivered at additional destination 205. However, for example in the case such as milk delivery in which objects to be delivered are not individually associated with destinations (in other words, objects to be delivered are delivered to a plurality of destinations without distinguishing individuals), an object to be delivered may also be delivered to additional destination 205.

As illustrated in FIG. 6, when the attribute of moving unit 100 is an automatic operating vehicle that is capable of transmitting and receiving delivery schedules and that is in a state other than a state with little fuel left, it is determined that there is no fixed part, and a second delivery schedule is generated. In this case, by virtue of the absence of the fixed part, the second delivery schedule is generated as illustrated in FIG. 5A, in which the next destination of moving unit 100 is revised from destination 202 to destination 205. This is because, even if an unscheduled delivery task arises during a trip after the start of delivery tasks, moving unit 100 capable of automatic operation is basically capable of receiving an instruction to revise the delivery schedule at any time and remains flexible in response to the unscheduled delivery task. Since the remaining amount of fuel is not small, there is a low possibility that the moving unit may become short of fuel even if the moving unit heads to destination 205 in addition to the first destinations included in one round of a trip on the first delivery schedule.

As illustrated in FIG. 6, when the attribute of moving unit 100 is an automatic operating vehicle that is capable of transmitting and receiving delivery schedules and that is in a state with little fuel left, the fixed part is determined as a group of destinations included in a current round of a trip, i.e., a group of destinations that are visited at once among the first destinations, and the second delivery schedule is generated without changing the fixed part. In this case, the second delivery schedule is generated as illustrated in FIG. 5C, in which the current round of a trip of moving unit 100 visiting the current round of a trip including visiting base station 200, destination 201, destination 202, and base station 200 is fixed, and the next round of a trip is revised from a round of a trip of vising base place 200, destination 203, destination 204, and base station 200 to a round of a trip vising base station 200, destination 205, destination 203, destination 204, and base station 200. This is because, if the moving unit responds to an unscheduled delivery task, the moving unit consumes extra fuel for that task and may become short of fuel. Note that if the moving unit is replenished with a sufficient amount of fuel in consideration of additional delivery to destination 205 when having returned to base station in the current round of a trip, it is possible to avoid a situation in which the moving unit becomes short of fuel when the moving unit heads to destination 205 in the next round of a trip.

As illustrated in FIG. 6, when attribute of moving unit 100 is a non-automatic operating vehicle that is capable of transmitting and receiving delivery schedules and that is at a stop, it is determined that there is no fixed part, and a second delivery schedule as illustrated in FIG. 5A is generated. This is because, even if an unscheduled delivery task arises during a trip after the start of delivery tasks, the driver of moving unit 100 incapable of automatic operation is able to check an instruction to revise the delivery schedule while the moving unit is at a stop, and therefore may be able to respond to the unscheduled delivery task.

As illustrated in FIG. 6, when the attribute of moving unit 100 is a non-automatic operating vehicle that is capable of transmitting and receiving delivery schedules and that is in a state in which the moving unit is positioned at a long distance from next destination 202, it is determined that there is no fixed part, and a second delivery schedule as illustrated in FIG. 5A is generated. This is because, when the distance to next destination 202 is long, the moving unit may be capable of responding to an unscheduled delivery task on the way to next destination 202, or when all things are considered, it is more efficient in delivery for the moving unit to respond to an unscheduled delivery task on the way to next destination 202.

As illustrated in FIG. 6, when the attribute of moving unit 100 is a non-automatic operating vehicle that is capable of transmitting and receiving delivery schedules and that is in a running state, next destination 202 is determined as a fixed part, and a second delivery schedule is generated without changing the fixed part. In this case, a second delivery schedule as illustrated in FIG. 5B is generated, in which after having delivered an object to be delivered to next destination 202, moving unit 100 runs to destination 205 and then returns to base place 200. This is because the driver of moving unit 100 incapable of automatic operation is unable to check an instruction to revise the delivery schedule during driving and is thus unable to respond to an unscheduled delivery task. Note that, after having delivered an object to be delivered to destination 202, the driver is able to check an instruction to revise the delivery schedule before heading to base place 200, and therefore the moving unit becomes capable of heading to additional destination 205.

As illustrated in FIG. 6, when the attribute of moving unit 100 is a non-automatic operating vehicle that is capable of transmitting and receiving delivery schedules and that is in a state in which the moving unit is positioned at a short distance from next destination 202, next destination 202 is determined as a fixed part, and a second delivery schedule as illustrated in FIG. 5B is generated without changing the fixed part. This is because, when the distance to next destination 202 is short, in most cases the moving unit is incapable of responding to an unscheduled delivery task on the way to next destination 202, or when all things are considered, it is more efficient in delivery for the moving unit to first complete the delivery to next destination 202 and then to respond to the unscheduled delivery task.

As illustrated in FIG. 6, when the attribute of moving unit 100 is a moving unit with cold-storage or refrigerated equipment, next destination 202 is determined as a fixed part, and a second delivery schedule as illustrated in FIG. 5B is generated without changing the fixed part. This is because, if the moving unit responds to an unscheduled delivery task, objects to be delivered (package) in a cold-storage or refrigerated state may become degraded in quality.

As illustrated in FIG. 6, when the attribute of moving unit 100 is a vehicle incapable of transmitting and receiving delivery schedules at places other than base place 200, a current round of a trip is determined as a fixed part, and a second delivery schedule as illustrated in FIG. 5C is generated without changing the fixed part. This is because, even if an unscheduled delivery task arises during a trip after the start of delivery tasks, moving unit 100 incapable of communication connection is also incapable of receiving an instruction to revise the delivery schedule and has to continue the current round of a trip. Note that, when having returned to base place 200 in the current round of a trip, the moving unit becomes capable of checking an instruction to revise the delivery schedule and heading to destination 205 in the next round of a trip.

As illustrated in FIG. 6, when the attribute of moving unit 100 is a vehicle with a predetermined order of loading (e.g., a vehicle for delivering objects to be delivered such as furniture that are large in size and are thus difficult to change the loading order, or typically a vehicle for removal), a current round of a trip is determined as a fixed part, and a second delivery schedule illustrated in FIG. 5C is generated without changing the fixed part. For example, when destination 205 is originally a destination that is visited next to destination 202, an object to be delivered to destination 202 is loaded after the loading of an object to be delivered to destination 205 by LIFO (last in, first out). That is, the objects to be delivered can be smoothly unloaded at destinations 202 and 205 in this order. In this way, when the order of loading is already determined, the current round of a trip is fixed because it is difficult to unload an object to be delivered at destination 205 before at destination 202.

As illustrated in FIG. 6, when the attribute of moving unit 100 is a vehicle driven by a driver of small experience, a current round of a trip is determined as a fixed part, and a second delivery schedule as illustrated in FIG. 5C is generated without changing the fixed part. This is because, even if an unscheduled delivery task arises during a trip after the start of delivery tasks, the driver of small experience may not be able to flexibly respond to the unscheduled delivery task.

Although not shown, when the state of moving unit 100 is a running state in a tunnel, next destination 202 is determined as a fixed part, and a second delivery schedule as illustrated in FIG. 5B is generated without changing the fixed part. This is because moving unit 100 running in a tunnel is incapable of receiving an instruction to revise the delivery schedule and is thus incapable of immediately responding to an unscheduled delivery task.

Although not shown, when the state of moving unit 100 is a running state on an express highway, next destination 202 is determined as a fixed part, and a second delivery schedule as illustrated in FIG. 5B is generated without changing the fixed part. This is because, even if an instruction to revise the delivery schedule has been received, there is a high possibility that moving unit 100 running on an express highway is incapable of flexibly responding to an unscheduled delivery task.

Note that the combinations of the attribute and state of moving unit 100 and the fixed part determined based on each combination as illustrated in FIG. 6 are merely examples and do not intended to limit the present disclosure to these examples.

Next, information processing system 10 determines whether or not the generation of the second delivery schedule has failed (step S19). What is determined as a failure in the generation of the second delivery schedule depends on company. For example, a company that handles an enormous number of objects to be delivered often encounter events that do not go according to the first delivery schedule, and therefore, it is difficult to generate a second delivery schedule adaptable to all such events. Thus, in the case of such a company, the occurrence of a situation where the generated second delivery schedule is adaptable to only a predetermined ratio (e.g., 80%) or less of events that have occurred may be determined as a failure in the generation of the second delivery schedule. Alternatively, the occurrence of a situation where the generated second delivery schedule is not adaptable to a given event may be determined as a failure in the generation of the second delivery schedule. As another alternative, for example, whether or not the generation of the second delivery schedule has failed may be determined by the user checking the generated second delivery schedule and determining whether the generation has succeeded or failed.

If the generation of the second delivery schedule has failed (Yes in step S19), information processing system 10 relaxes constraints for the generation of the second delivery schedule on the basis of the attribute of moving unit 100 (step S20). For example, information processing system 10 determines constraints that are to be relaxed from among dispensable ones of the constraints on the basis of the attribute of moving unit 100. Examples of the constraints include constraints on the time zone of delivery, constraints on the number of objects that are to be delivered and that can be loaded on moving unit 100, and constraints on trip distance, and some of the constraints may be relaxed depending on the attribute of moving unit 100. Note that the constraints include indispensable constraints and dispensable constraints, and whether each constraint is indispensable or dispensable varies depending on company. For example, when a company uses moving unit 100 capable of automatic operation (unattended moving unit), or in other words, when the attribute of moving unit 100 is an unattended moving unit, the constraints on the time zone of delivery are not indispensable constraints and therefore can be relaxed, i.e., extended because the unattended moving unit is capable of handling a large number of tasks. On the other hand, when a company uses moving unit 100 incapable of automatic operation, or in other words, when the attribute of moving unit 100 is not an unattended moving unit, the constraints on the time zone of delivery may become indispensable constraints because there is an upper limit for the number of tasks that can be handled by the driver of moving unit 100. On the basis of the relaxed constraints, information processing system 10 regenerates a second delivery schedule. In this way, when the generation of the second delivery schedule has failed, dispensable constraints are relaxed on the basis of the attribute of moving unit 100. This increases the possibility of success in the generation of the second delivery schedule.

When the generation of the second delivery schedule has succeeded (No in step S19), information processing system 10 transmits the generated second delivery schedule to moving unit 100 or other units in order to cause the units to perform delivery tasks according to the second delivery schedule.

Alternatively, the first delivery schedule and the second delivery schedule may be presented. This will be described with reference to FIG. 7.

FIG. 7 shows an example of presentation when a delivery schedule is revised from the first delivery schedule to the second delivery schedule.

For example, the first delivery schedule for delivery of packages to two houses including the Yamada residence and the Suzuki residence is presented as illustrated in the left section in FIG. 7. Note that the application and attribute of the moving unit used for delivery may also be presented, together with the delivery schedule. Although not shown, the state of the moving unit may also be presented. Then, for example, when the second delivery schedule that additionally includes the Sato residence as a destination has been generated, the second delivery schedule that includes delivery to the Sato residence between delivery to the Yamada residence and delivery to the Suzuki residence is presented as illustrated in the right section in FIG. 7. Here, destinations (and a route) determined as the fixed part and the other destinations (and a route) in the generation of the second delivery schedule may be presented in different forms. In the example in FIG. 7, the destinations determined as a fixed part in the generation of the second delivery schedule are presented in plain color, and the destination that can be changed is presented with dots.

In the example in FIG. 7, the delivery schedule is expressed as a list of destinations, but the delivery schedule may be expressed by mapping on a map as illustrated in FIGS. 4 and 5A to 5C.

As described above, depending on the operational system of a company, the first delivery schedule may include a fixed part regarding destinations that are not allowed to be changed. For example, depending on the operational system of a company, the attribute of a moving unit to be used for delivery by the company may vary, and the fixed part may correspond to the attribute of the moving unit. If the second delivery schedule is generated by revising the fixed part, the generated second delivery schedule may not be adaptable to the company. In contrast, the fixed part is determined based on the attribute of a moving unit, and the second delivery schedule that replaces the first delivery schedule is generated without changing the fixed part (in other words, by changing parts other than the fixed part). That is, according to the embodiment, it is possible to regenerate a delivery schedule adaptable to the operational system of a company. By generating a delivery schedule adaptable to the operational system of a company, it is possible to improve efficiency of delivery while responding to revisions in delivery tasks.

OTHER EMBODIMENTS

While information processing system 10 and the information processing method according to one or a plurality of aspects of the present disclosure have been described thus far in accordance with the embodiment, the present disclosure is not intended to be limited to this embodiment. The present disclosure also includes other embodiments such as those obtained by making various modifications conceivable by a person skilled in the art to the above-described embodiment, and those obtained by arbitrarily combining any of the constituent elements and functions in the above-described embodiment within a scope that does not depart from the gist of the present disclosure.

For example, the purpose of moving units is not limited to delivery according to the present disclosure. Specifically, the purpose of moving units may be providing service. For example, in the case of medical care service, it is conceivable that moving units visit houses of patients in rounds of trips. That is, a round schedule is generated as a trip schedule. In this case, providers of medical care service such as doctors or nurses, or medical devices are mounted on the moving units.

For example, in the case of an emergency case, information processing system 10 determines a fixed part regarding destinations that are not allowed to be changed on a round schedule on the basis of the attribute of a moving unit used to provide medical care service. Examples of the attribute of the moving unit for providing medical care service include the number of patients that can be transported with the moving unit and the presence or absence of on-vehicle medical care equipment. The on-vehicle medical care equipment is one example of service equipment. Then, information processing system 10 generates a second round schedule without changing the fixed part on the basis of the position of the moving unit and a plurality of destinations including a place where an emergency case has occurred.

For example, in the case where service refers to tasks such as repair or maintenance of equipment, it is conceivable that moving units visit houses in which objects targeted for tasks are held, in rounds of trips. That is, a round schedule is generated as a trip schedule. In this case, operators for repair or maintenance, or operation appliances are mounted on the moving units.

For example, in the case where a request for an urgent need of repair or maintenance has been received or when a task has been cancelled, information processing system 10 determines a fixed part regarding destinations that are not allowed to be changed on the round schedule on the basis of the attribute of the moving unit for providing operation service. Then, information processing system 10 generates a second round schedule without changing the fixed part, on the basis of the positions of the moving units and a plurality of destinations that include a place where the request for an urgent need of operation has occurred, but do not include a place where the operation has been cancelled.

For example, in the case of sales service, it is conceivable that moving units visit houses of persons targeted for sales. That is, a round schedule is generated as a trip schedule. In this case, business managers or objects such as documents for use in sales are mounted on the moving units.

For example, in the case where a client is added or an appointments for sales is cancelled, information processing system 10 determines a fixed part regarding destinations that are not allowed to be changed on a round schedule on the basis of the attribute of a moving unit that is used for sales. Then, information processing system 10 generates a second round schedule without changing the fixed part on the basis of the positions of the moving units and a plurality of destinations that include added clients, but do not include cancelled clients.

The present disclosure may be realized as a program for causing a computer to execute the steps included in the information processing method. Moreover, the present disclosure may be realized as a non-transitory computer-readable recording medium such as a CD-ROM that stores the aforementioned program.

For example, when the present disclosure is realized as a program (software), each step is executed by executing a program using hardware resources such as a CPU, a memory, and input/output circuits of the computer. That is, each step is executed by the CPU acquiring and computing data from, for example, the memory or the input/output circuits, or by the CPU outputting the result of computation to, for example, the memory or the input/output circuits.

According to the present disclosure, units, apparatuses, systems, members, all or some members, and all or some functional blocks illustrated may be executed by one or a plurality of electronic circuits including a semiconductor device, a semiconductor integrated circuit (IC), or a large scale integrated circuit (LSI). The LSI or the IC may be integrated into a single chip, or may be configured by a combination of a plurality of chips. For example, functional blocks other than memory elements may be integrated on a single chip. Here, the circuits are referred to as the LSI or the IC, the names of the calls vary depending on the degree of integration, and circuits may be called system LSI, very large scale integration (VLSI), or ultra large scale integration (ULSI). A field programmable gate array (FPGA) programmed after the manufacture of LSI or a reconfigurable logic device that can reconfigure the relationship of bonding inside the LSI or can set up circuit sections inside the LSI may also be used for the same purpose.

Moreover, the functions or operations of all or some units, apparatuses, members may be executed by software processing. In this case, software is recorded on a non-transitory recording medium such as one or a plurality of ROMs, optical disks, or hard disk drives (HDDs), and when the software is executed by a processing device (processor), specific functions indicated by the software may be executed by a processing device (processor) or other peripheral equipment. The systems or apparatuses may include one or a plurality of non-transitory recording media that record software, a processing device (processor), and necessary hardware devices such as an interface.

INDUSTRIAL APPLICABILITY

The information processing method according to the present disclosure is applicable to a system for providing delivery or service.

The invention claimed is:
1. An information processing method executed by a computer, the information processing method comprising:
   acquiring a first trip schedule generated based on a plurality of first destinations and a moving unit for providing delivery or service based on the plurality of first destinations;
   acquiring as an attribute of the moving unit;
   acquiring a plurality of second destinations obtained from a revision in the plurality of first destinations after generation of the first trip schedule;
   determining a fixed part that indicates a destination that is not allowed to be changed on the first trip schedule of the moving unit, in accordance with the attribute of the moving unit; and
   generating a second trip schedule in accordance with the plurality of second destinations and the moving unit, without changing the fixed part,
   wherein when generation of the second trip schedule has failed, a constraint on the generation of the second trip schedule is relaxed based on the attribute of the moving unit.

2. The information processing method according to claim 1,
   wherein the fixed part is a group of destinations that are included in one round of a trip among the plurality of first destinations.

3. The information processing method according to claim 1, further comprising:
   acquiring a state of the moving unit; and
   determining the fixed part in accordance with the attribute of the moving unit and the state of the moving unit.

4. The information processing method according to claim 3,
   wherein the state of the moving unit includes a state of a remaining amount of moving energy, a running state, or a distance from a destination.

5. The information processing method according to claim 1, further comprising:
   determining the constraint to be relaxed from among dispensable constraints included in all constraints on the generation of the second trip schedule, in accordance with the attribute of the moving unit.

6. The information processing method according to claim 1, wherein the attribute of the moving unit includes an attribute regarding whether or not automatic operation is possible, an attribute regarding whether or not communication connection is possible, or an attribute regarding a type of delivery equipment or service equipment that is to be mounted on the moving unit.

7. An information processing system comprising:
a memory configured to store a program; and
a processor configured to execute the program and control the information processing system to:
acquire a first trip schedule generated based on a plurality of first destinations and a moving unit for providing delivery or service based on the plurality of first destinations;
acquire as an attribute of the moving unit;
acquire a plurality of second destinations obtained from a revision in the plurality of first destinations after generation of the first trip schedule;
determine a fixed part that indicates a destination that is not allowed to be changed on the first trip schedule of the moving unit, in accordance with the attribute of the moving unit; and
generate a second trip schedule in accordance with the plurality of second destinations and the moving unit, without changing the fixed part; and
a relaxer which relaxes, when generation of the second trip schedule has failed, a constraint on the generation of the second trip schedule based on the attribute of the moving unit.

* * * * *